Aug. 14, 1934. M. DE GREGORIO 1,970,497
WINDSHIELD WIPER
Filed Jan. 13, 1934
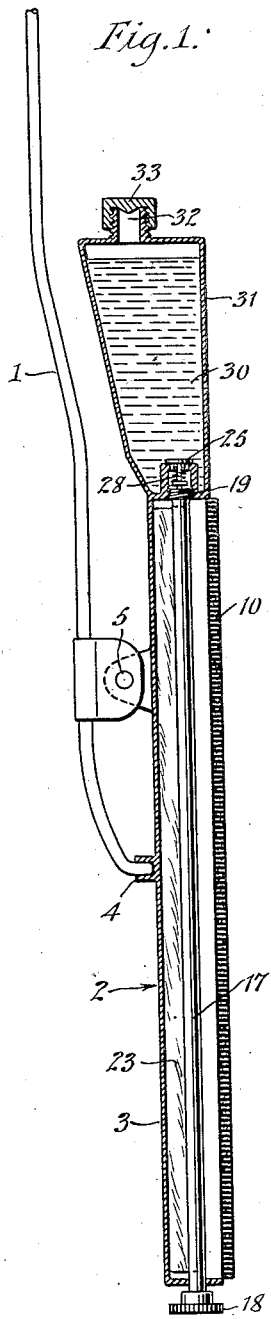
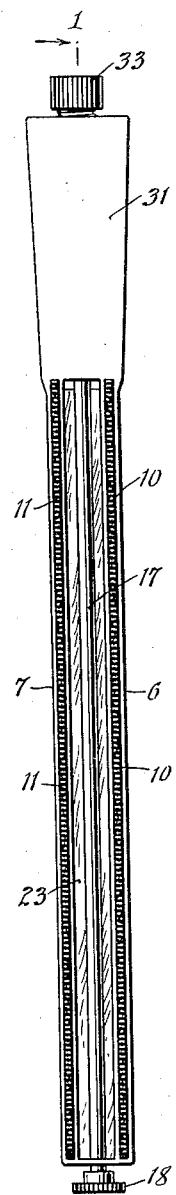
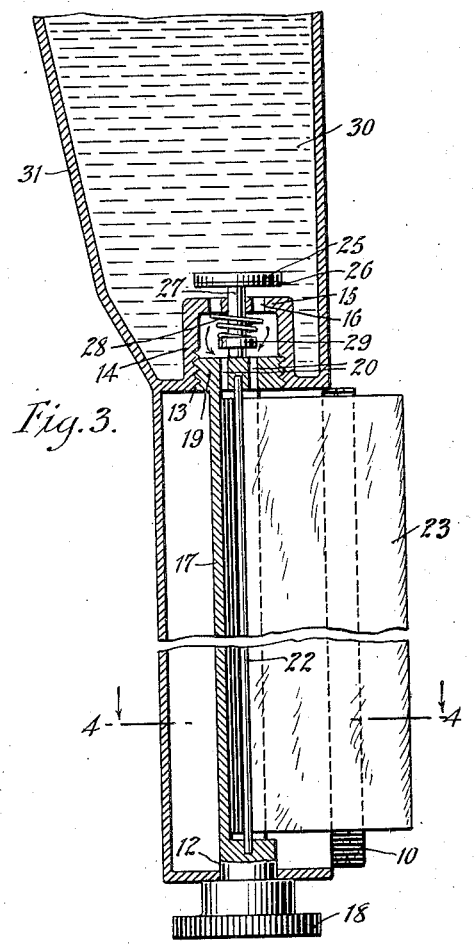
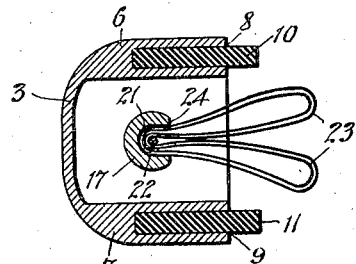
INVENTOR
Michael De Gregorio Patented Aug. 14, 1934

1,970,497

UNITED STATES PATENT OFFICE 1,970,497

WINDSHIELD WIPER

Michael De Gregorio, Port Washington, N. Y.

Application January 13, 1934, Serial No. 706,554

4 Claims. (Cl. 15—250)

This invention relates to windshield wipers and has for an object to provide an improved construction which may operate to readily clean a window under ordinary circumstances in an efficient manner.

Another object of the present invention is to provide a windshield wiper which is adapted to clean the windshield of an automobile under unusual conditions as, for instance, when snow or freezing water is on the windshield.

A further object, more specifically, is to provide a windshield wiper which is adapted to swing back and forth by the usual power mechanism now in common use, but which will apply alcohol or other liquid to the surface of the windshield to prevent freezing and to assist in cleaning, while at the same time presenting a plurality of rubbing surfaces.

In the accompanying drawing—

Figure 1 is a longitudinal vertical sectional view through Figure 2;

Figure 2 is an edge view of a windshield wiper disclosing an embodiment of the present invention, the motor for operating the same being eliminated;

Figure 3 is a view somewhat similar to Figure 1 but on a greatly enlarged scale, and with the central part broken away and the snow and ice cleaner shown in operative position;

Figure 4 is a transverse sectional view through Figure 3 on the line 4—4.

Referring to the accompanying drawing by numeral, 1 indicates an arm which may be of the usual construction, the upper end having been broken away. The arm 1 is connected to a motor of any desired kind now in common use, whereby the arm may be swung back and forth to cause the wiper 2 to move back and forth over the windshield. The wiper 2 is provided with what may be termed a casing 3 having a socket member 4 secured thereto in any desired manner and accommodating one end of the arm 1. A hinge structure 5 also acts to connect the arm with the casing 3. The end of arm 1 is loosely arranged in the socket 4 so that as the wiper 2 engages the glass it may tilt slightly on the hinge 5, the end of the arm moving up and down in the socket 4 to permit slight adjustment of any irregularities in the windshield. It will be understood that the windshield wiper embodying the invention is to be used at the usual place and that it swings back and forth in the usual manner of an ordinary windshield now on the market.

The casing 3 is shown in Figure 4 as being substantially U-shaped in cross section and the ends are closed except for certain apertures hereinafter described. As shown in this figure the casing 3 is provided with thickened walls 6 and 7, said walls having sockets 8 and 9 extending for substantially the full length of the casing 3 so as to accommodate the wiping members 10 and 11. These members may be made from rubber or other desired material and are preferably held in place by friction so that they may be removed and new ones substituted whenever desired. It will be observed that these members are arranged parallel to each other and both members rub the windshield at the same time thus providing a double rubbing action.

As shown in Figure 3 the casing 3 is provided with apertures 12 and 13, aperture 13 being internally threaded with the part of the casing forming the annular upstanding wall 14 having an end 15 closed except for the apertures 16. A tube 17 extends through the aperture 13, said tube at one end having a thumb member 18 whereby the tube may be rotated, and at the other end an enlarged exteriorly threaded screw member 19 adapted to be screwed into the internally threaded aperture 13. One or more apertures 20 are provided in the screw member 19 so that anything within the upstanding wall 14 may readily flow through these apertures downwardly into the bore 21 of tube 17. A comparatively small rod 22 is anchored in suitable sockets adjacent the respective ends of tube 17 as shown in Figure 3, and around this tube is looped a sheet of fabric 23. When any liquid passes down through the apertures 20 it will strike this fabric and saturate the same so that when this fabric is in the position shown in Figures 3 and 4 it will apply the liquid more or less evenly over the surface to be cleaned. It will be observed that there is provided a longitudinal slot 24 in the tube 17 and that the folded fabric sheet 23 extends through this slot and is looped over the pin or rod 22.

When the parts are in the position shown in Figures 3 and 4 the fabric is functioning to apply liquid to the glass to melt any ice or snow thereon so as to clean this or other objectionable matter. Where ordinary rain strikes the windshield the fabric 23 is not used and when not in use it is wound more or less on the tube 17. For instance, the thumb member 18 is rotated counter clockwise as shown in Figure 3 until the cloth 23 is nested within the casing 3 as shown in Figures 1 and 2. This requires a half or two-third revolution of the tube 17, and as the tube moves to this extent the member 19 will be unscrewed to a certain extent. This will result in allowing the valve member 25 to move downwardly and rest on the end 15, thus closing the aperture 16. If desired, the valve member 25 could be provided with a gasket or washer 26 so as to insure a tight connection. The valve member 25 is provided with a stem or rod 27 which continually rests on the member 19 and is pressed against the same by the spring 28, which spring acts against the end 15 and against the abutment 29 which is secured to the stem 27 in any desired manner. It will be noted that when the member 19 is rotated so as to move away from the end 15, the spring 28 will automatically function to move the valve member 25 downwardly against the seat, namely, against the upper surface of end 15. In this way the liquid 30 is shut off from the interior of the annular wall 14 and, consequently, it cannot be supplied to the fabric 23, which under these circumstances is nested within the casing 3. From Figure 1 it will be seen that the liquid 30 is arranged in a container 31 which is integral with or rigidly secured to the end of the casing and is provided at the upper part with a filling neck 32 normally closed by the cap 33. It will be understood that in use the wiper is so positioned that the container 31 is at the highest point and, consequently, the liquid may flow downwardly in the casing 3 whenever permitted.

In warm weather during a rain storm the ordinary wiper may serve the purpose very nicely or the wiper of the instant case would serve the purpose when using only the wiping members 10 and 11. However, during a snow storm or when mist or rain is freezing on the windshield, the members 10 and 11 will not function to remove ice or snow. To accomplish this the parts are arranged as shown in Figures 3 and 4, whereupon a small quantity of liquid, for instance, alcohol or other liquid, is applied to the windshield and by means of the rubbing members 10 and 11 secures the result of removing the ice or snow therefrom or to prevent the accumulation of ice and snow.

It will be understood that ordinarily the fabric 23 is not used but only the rubbing members 10 and 11. However, whenever snow or ice tends to accumulate on the windshield, the thumb member 18 is actuated so as to release the fabric and at the same time open valve 25, whereupon the fabric 23 will begin to function and spread the alcohol or other liquid on the windshield.

I claim:—

1. A windshield wiper including a casing substantially U-shaped in cross section, each leg of the U being slotted, a flat rubber member fitted into each slot and extending beyond the casing to produce wiping members, a rotatable member extending through the casing centrally thereof, said rotatable member being rotatably mounted on the casing about its own axis, a piece of fabric carried by said rotatable member, and means for supplying liquid to the fabric, said fabric when functioning extending beyond the casing so that the liquid may be applied at the same time that said wiping members function.

2. A windshield wiper including a casing substantially U-shaped in cross section, rubbing members carried by each leg of the U-shaped member, a tubular member rotatably mounted on the casing about its own axis and positioned to extend longitudinally through the U-shaped member, said tubular member having an opening between the ends thereof, a sheet of fabric having a portion extending into said opening, a rod carried by the tubular member and positioned to clamp the fabric against the tubular member in an operative position, whereby when the tubular member is rotated in one direction the fabric will be wound substantially around the same and nested within the casing and when rotated in the other direction the fabric will project beyond said casing, means for supplying liquid to said fabric, and a valve member for controlling the flow of said liquid 3. A windshield wiper including a substantially U-shaped casing, a wiping member extending from each longitudinal edge of the U-shaped casing, a tubular member rotatably mounted on the casing about its own axis and extending through and beyond the ends of said casing, said tubular member at the lower end being provided with a hand operated knob and at the upper end with an enlarged externally threaded member, said threaded member having an aperture therein communicating with the interior of said tubular member, said tubular member having a slot extending longitudinally thereof, a rod extending through the tubular member, a sheet of fabric looped over said rod and extending through the slot in the tubular member beyond the casing, a container carried by the upper end of the casing, said container being adapted to contain liquid to be applied to said fabric, means within the container forming a housing surrounding said enlarged threaded member, said housing having a threaded part coacting with said externally threaded member for causing the tubular member to move longitudinally when rotated, the interior of said housing being in free communication with the aperture in said externally threaded member and having passageways providing continuous communication with the interior of said container, a valve, a spring acting on the valve for moving the same to close said passageway, said valve also being provided with a stem normally resting on said enlarged threaded member, whereby when the enlarged threaded member is in one position, the valve is held open, and when in a second position the valve is permitted to close.

4. A windshield wiper including an elongated casing open on one longitudinal side, an elongated fabric carrying member rotatably mounted in the casing about its own axis, a piece of fabric carried by said fabric carrying member and positioned to extend through said opening in the casing when the fabric carrying member is in one position, said fabric carrying member being positioned to extend through said casing with the respective ends of the fabric carrying member projecting through the ends of the casing, a container for a liquid arranged at one end of the casing positioned to surround one end of said fabric carrying member, a valve interposed between the casing and the container, and means coacting with the casing and with said rotatable fabric carrying member to cause the rotatable fabric carrying member to move longitudinally when rotated, the end of said rotatable fabric carrying member extending into said container being positioned to engage said valve when the rotatable fabric carrying member is rotated in one direction to open the valve.

MICHAEL DE GREGORIO.